United States Patent [19]
Piper

[11] 3,727,511
[45] Apr. 17, 1973

[54] METHOD AND APPARATUS FOR TEACHING MUSIC CHORDS

[76] Inventor: Valeria C. Piper, 4315 Blagden Avenue N.W., Washington, D.C. 20011

[22] Filed: Dec. 4, 1970

[21] Appl. No.: 95,075

[52] U.S. Cl. ............................. 84/471, 273/134 AD
[51] Int. Cl. ............................................. G09b 15/02
[58] Field of Search ..................... 84/470, 471, 477, 84/478, 474; 273/134 AD

[56] References Cited

UNITED STATES PATENTS

| 763,870 | 6/1904 | Finley | 84/474 |
| 3,070,371 | 12/1962 | Hearle | 84/471 X |
| 555,213 | 2/1896 | Featherstone | 84/471 X |

FOREIGN PATENTS OR APPLICATIONS

| 916,914 | 1/1963 | Great Britain | 273/134 AD |

Primary Examiner—Richard B. Wilkinson
Assistant Examiner—Lawrence R. Franklin
Attorney—Beveridge & De Grandi

[57] ABSTRACT

Apparatus for teaching music chords for educational or for use in a game, including a game board having a center area and a plurality of groups of elongated areas or channels radiating outwardly from the center area at angularly spaced locations. Each group corresponds to a different musical scale the first note of which is represented by indicia at points on the circumference of the center area adjacent the inner boundary of the group of elongated areas respectively. The number of elongated areas in each group corresponds to the number of notes in a musical chord; in the case of piano this number being three. Spaced along the elongated areas in each group are indicia corresponding to the sequential notes in each scale. A plurality of studs which may be pins or pegs are located permanently on opposite sides of each of the groups at stations corresponding to each chord. A plurality of connecting members such as rubber bands are provided for interconnecting the studs associated with adjacent groups so that the position of each of the chords may be traced throughout the different scales. Additionally, a plurality of removable studs such as pins or pegs are provided for insertion into the board in the elongated areas adjacent a note which is a sharp or a flat note in a particular chord.

3 Claims, 3 Drawing Figures

PATENTED APR 17 1973 3,727,511

INVENTOR
VALERIA C. PIPER

BY *Beveridge & DeGrandi*

ATTORNEYS

METHOD AND APPARATUS FOR TEACHING MUSIC CHORDS

SUMMARY OF INVENTION AND OBJECTS

The present invention generally relates to method and apparatus for teaching music chords and which may also be employed for amusement purposes as in a game. More specifically, the present invention relates to a method and apparatus for teaching the structure of music chords as well as their interrelationship in different musical scales.

One of the objects of the present invention is to provide a novel method and apparatus for teaching music chords.

A further object of the present invention is to provide such a method and apparatus which will be highly effective in creating in the mind of a student, a graphic impression of chord structure as well as interrelationships of chords in different scales.

A further object of the present invention is to provide such a method and apparatus which will be easy and economical to implement for use in teaching young or old students.

A further object of the present invention is to provide a novel game relating to music chords. Included herein is a provision of such a game which may be played by a person alone such as in a puzzle or by a plurality of persons playing together in competition with each other.

In one embodiment of the invention, the above and other objects are achieved by including a game board having a center area and a plurality of groups of elongated areas or channels radiating outwardly from the center area at angularly spaced locations. Each group corresponds to a different musical scale the first note of which is represented by indicia at points on the circumference of the center area adjacent the inner boundary of the group of elongated areas respectively. The number of elongated areas in each group corresponds to the number of notes in a musical chord; in the case of piano this number being three. Spaced along the elongated areas in each group are indicia corresponding to the sequential notes in each scale. A plurality of studs which may be pins or pegs are located permanently on opposite sides of each of the groups at stations corresponding to each chord. A plurality of connecting members such as rubber bands are provided for interconnecting the studs associated with adjacent groups so that the position of each of the chords may be traced throughout the different scales. Additionally, a plurality of removable studs such as pins or pegs are provided for insertion into the board in the elongated areas adjacent a note which is a sharp or a flat in a particular chord.

Different colored rubber bands may be provided corresponding to the different chords. Additionally, the colors of the removable pins may be different so that for example, when the first note in a chord is to be sharped, a certain color pin is provided; the middle note in a chord is to be sharped another color is provided; and the third note in a chord is to be sharped yet another color is provided. Additionally, a plurality of removable strips are provided which may be placed in overlying relationship to the groups of areas on the surface of the game board to change the particular scale thereof as designated on the board itself. Each of the scale strips has suitable indicia corresponding to the scale which is to be substituted. For providing a game which several players may participate in, a pointer is provided to be rotatably mounted in the center area and the latter is divided into segments by lines radiating from the center thereof.

Other objects and advantages of the present invention will become more apparent from the following more detailed description taken in conjunction with the attached drawing in which.

DETAILED DESCRIPTION

Figure 1:
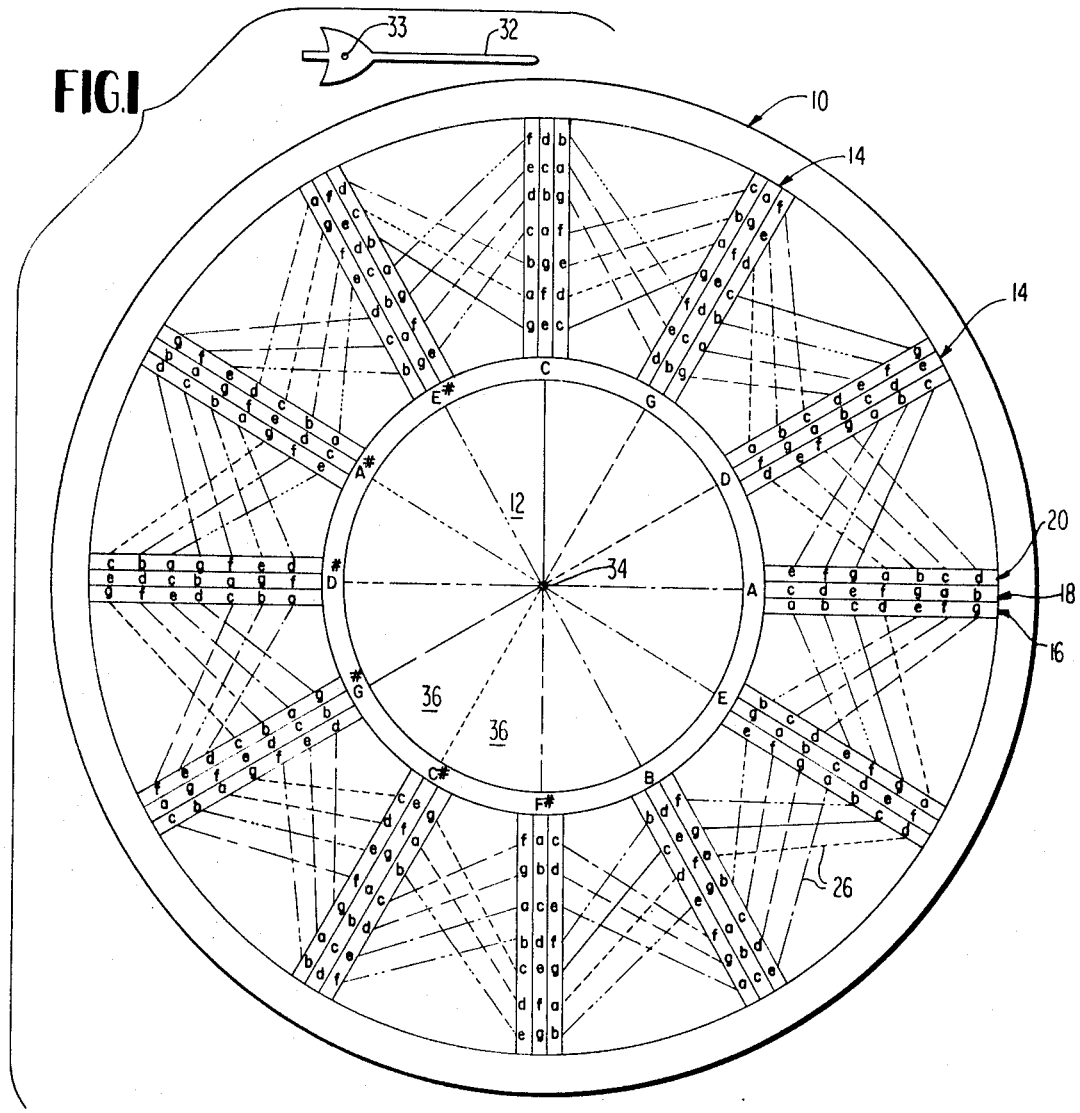
FIG. 1 is a plan view of a working or game board shown in schematic form according to one embodiment of the present invention.

Referring now to the drawings in detail, there is shown for illustration purposes only, the top surface of a game board generally designated 10 representing an embodiment of the present invention. Game board 10 may be formed from any suitable wood, metal, plastic or other material which is relatively rigid and forms a flat playing or work surface. In the center of board 10 is a circular area 12 outwardly from which radiate a plurality of groups 14 of elongated areas designated 16, 18 and 20. Groups 14 are equi-angularly spaced from each other around the circumference of center area 12 as illustrated in FIG. 1. Center area 12 and groups 14 may be applied to the top of a game board in any suitable manner such as by printing, stencilling, decals or otherwise.

Along the circumference of center area 12 at locations adjacent the inner boundaries of groups 14 are placed, on the top surface of the game board 10, indicia corresponding to the root or beginning note of different scales all of whose notes appear in suitable indicia at spaced locations along group 14 as indicated. In the specific embodiment shown, indicia representing the following root notes appear around the circumference of center area 12: C major, G major, D major, E major, B major, F sharp, C sharp, G sharp, D sharp, A sharp and E sharp in clockwise order.

With respect to the scales starting with the note C sharp, it will be seen that the associated group 14 has the indicia c, d, e, f, g, a, b corresponding to the sequential arrangement of notes in the scale starting with C major. Similarly, with respect to the scales starting with G major, the associated group 14 has the notes indicated thereon, g, a, b, c, d, e, f which constitute the notes of the scale starting with G major in sequential order.

Each group 14 in the shown embodiment includes three elongated areas designated 16, 18 and 20 because the three areas correspond to the three notes which make up a basic chord played on a piano. In each group 14, the elongated area 16 would represent the first or bottom note of the chord, the elongated area 18 the middle or second note of the chord, and the elongated area 20 the top or third note of the chord. Thus for example, the chord including the notes c, e, g played in the scale of C major would be represented as the innermost station along group 14 as shown in the top center of FIG. 1 of the drawings. Although for purposes of illustration only, each of the chords in the scale of C major have been represented in the drawings with each of the notes included therein, the game board may not contain all of this indicia; however it is preferred that board 10 contain at least the indicia pertaining to each of the notes in the scales in each of the groups 14; such notes constituting the first or bottom note in each of the chords. It will be appreciated that for chords containing more or less than three notes, such as may be played on instruments other than a piano, a corresponding different number of elongated areas in each group will be employed.

Figure 2:
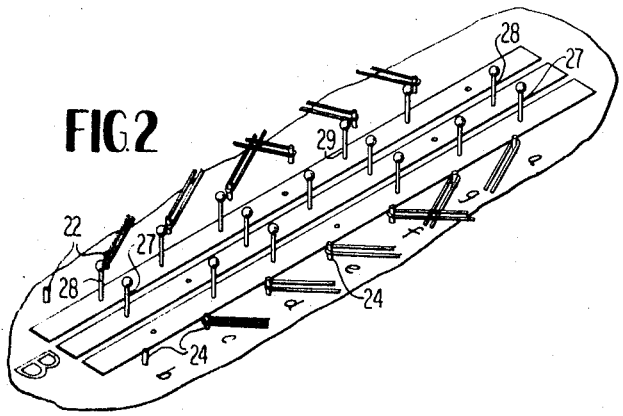
FIG. 2 is an enlarged perspective view of a section of the top surface of the board in FIG. 1.

According to the present invention, by tracing the position of each chord in the various scales indicated on the board, the student will learn the interrelationships of the chords. In the specific embodiment shown, this is achieved by a plurality of stud members designated 24 which may be pins, pegs or other members received in apertures formed in the top surface of the game board 10 adjacent the various chord stations along each group 14. As shown in FIG. 2, studs 24 are placed on opposite sides of each of the groups 14 for receiving interconnecting members 26 which may be strings or rubber bands or any other suitable interconnecting members which may be applied between studs 24 of adjacent groups 14 as schematically illustrated in FIG. 1.

It is preferred that different colored connecting members 26 be employed for the different chords respectively. As stated above, the object of the game or musical instruction in one form of the invention is to interconnect the same chord in the different scales represented in groups 14 using the interconnecting members 26. FIG. 1 shows schematically a completed design resulting from interconnecting the various chords for the scales indicated.

In order to indicate that a note in a specific chord of a specific scale is sharp or flat, a second set of studs which may be pegs or pins 27, 28 and 29 are provided. Thus for example, if the bottom note in the chord is sharp or flat, the pin 27 would be used placing it in elongated area 16 at the appropriate station for the particular chord. The middle notes of each of the chords are indicated to be sharp or flat by pin 28 placed in the middle elongated area 18 while the top notes of the chords, are indicated to be sharp or flat by pins 29 placed in elongated area 20. Preferably pins 27, 28 and 29 have different color heads to differentiate therebetween. Taking the chords in the scale of B major as an example, FIG. 2 illustrates the use of pins 27, 28, and 29 indicating the various notes that are sharped in the various chords. For example, the chord b, d, f in the scale B has the middle note D sharp as indicated by pin 27 and the top note F sharp as indicated by the pin 28.

In instructing a student with the use of the present invention, a student may be asked to interconnect the various chords starting with a clean or vacant board except for the studs 24. The resulting pattern of interconnecting members 26 will indicate whether the student has correctly related the chords throughout the various scales.

Figure 3:
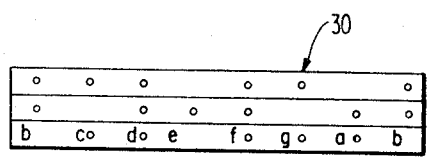
FIG. 3 is a plan view of one of a plurality of strips which may be employed in carrying out the invention as will be described.

If it is desired to change the various scales indicated on the top surface of the board, a plurality of strips one of which is shown as 30 in FIG. 3 may be provided for superimposition over the groups 14. Each strip 30 will have the notes of the scale which it represents. Additionally, the strips may contain indicia such as the dots shown, representing the notes of the chords included therein which are sharp or flat. When not in use or for substitution purposes, strips 30 may be removed from the surface of board 10. In an alternative embodiment, not shown, the entire scale pattern may be changed by superimposing a sheet over the entire playing surface. This sheet would have different scale groups 14 than that on the surface of the game board. Additionally, instead of interconnecting the chords by rubber bands, they may be interconnected on the sheet by drawing straight lines between the various chord stations. After use the sheet may be removed from the board and stored or disposed of thus clearing the board 10 for another sheet.

The present invention may also be employed as a game in which several players may participate using a pointer 32 having an aperture 33 at one end through which the pointer may be movably mounted in the center 34 of board 10 for rotation throughout the center area 12. Additionally, center area 12 is divided in the shown embodiment in 12 equal segments 36 delineated by the shown dotted lines which may be suitably printed or otherwise placed on the top surface of board 10.

Each player depending on how many players are in the game, is allotted a number of different scales with the object of interconnecting all of the chords of allotted scales first; that is, before the other players interconnect the chords of their allotted scales. To determine how many rubber bands or interconnecting members 26 may be applied during each turn of a player, dial 32 is rotated. If the dial 32 stops for example in the semicircle to the left of C major, he may apply one rubber band 26, if the dial 32 stops in the semicircle to the right of C major, he may apply two rubber bands 26, and if the dial 32 stops along the line between the two semicircles, he may apply three rubber bands 26 or none depending on the desired rules. Any other suitable arrangement governing the applications of rubber bands 26 may obviously be substituted. It furthermore will readily be seen that several other variations of the same game may be played using the same game board and apparatus described and shown herein, and that the invention need not be limited to the specific game mentioned above.

I claim:

1. In combination, a board for use in a game or music instructions, said board having on one side thereof first indicia means representing root notes of musical scales positioned around a circle in the order of a circle of fifths, musical scale indicia radiating outwardly from each of said root notes, each of said musical scale indicia including a plurality of columns of letter-named notes, one of said columns representing the sequential notes of the musical scale beginning with the associated root note, the remaining columns forming rows with each of said sequential notes, each row comprising a basic chord; means indicating a chord station located adjacent each of said rows; a plurality of studs for placement at each of said chord stations; and a plurality of connecting members for interconnecting studs whose adjacent rows have chords possessing the same letters disregarding sharps and flats.

2. The combination of claim 1 wherein said basic chords are major triads.

3. The combination of claim 1 further including a second plurality of studs which may be removably placed adjacent any letter which is sharped or flatted in its scale.

* * * * *